Jan. 24, 1928.　　　　　　　　　　　　　　　　　　1,657,295
A. P. BARK ET AL
METHOD AND APPARATUS FOR SHEARING
Filed Sept. 20, 1926　　　　　7 Sheets-Sheet 4

Jan. 24, 1928. 1,657,295
A. P. BARK ET AL
METHOD AND APPARATUS FOR SHEARING
Filed Sept. 20, 1926 7 Sheets-Sheet 5

INVENTOR
Arnold P. Bark
Lars Johnson
by their attys.
Byrnes, Stebbins &
Parmelee Patented Jan. 24, 1928.

1,657,295

UNITED STATES PATENT OFFICE.

ARNOLD P. BARK, OF PITTSBURGH, AND LANE JOHNSON, OF INGRAM, PENNSYLVANIA, ASSIGNORS TO THE UNITED ENGINEERING & FOUNDRY COMPANY, OF PITTSBURGH, PENNSYLVANIA, A CORPORATION OF PENNSYLVANIA.

METHOD AND APPARATUS FOR SHEARING.

Application filed September 20, 1926. Serial No. 136,463.

This invention relates to method and apparatus for shearing, and particularly the shearing or cutting off of bars and ingots. This application is a continuation in part of our application, Serial No. 62,758, filed October 16th, 1925.

For certain purposes, it is undesirable or even impossible to shear a bar in the ordinary way, either because of the desired characteristics of the sheared piece, or the size of the article being sheared. For example, in the manufacture of car wheels, it is desired to cut slabs or disks off the end of a bar or ingot which disks may be twenty inches in diameter by as much as twenty inches thick. The difficulties of shearing such a large piece of metal and producing a disk which will not have a ragged edge or other defects, making it unsuitable for the production of a car wheel, are apparent. In the cutting off of bar stock, it is frequently desired to get a smooth cut which will not leave any ragged edges or torn surfaces.

We provide for moving both the work and the shear in a direction having a component along the surface where the shear engages the work and simultaneously causing relative movement of the shear and the work towards one another. For round bars the desired movement may be effected by rotating the bar, bringing the shear into engagement with its surface and causing movement of the shear in such manner as to secure a component of movement along the surface where the shear engages the bar, and also a component of movement towards the bar.

The invention is preferably carried out by providing a ring having an internal shearing edge through which the bar to be cut off is projected. The bar and the ring are rotated and relative sidewise movement of the bar and the ring is then effected. Preferably the ring and the bar are rotated at the same speed, although this is not essential. The shearing edge has a slicing action on the work in addition to its movement towards the center of the bar.

The invention is applicable to the shearing of a large number of articles and any suitable power may be used, depending on the size and character of the work at hand.

We preferably employ a drive consisting of a pinion meshing with gear teeth on the shearing ring, this ring being mounted in a frame which has pivotal movement around the pinion shaft. With this arrangement a simple and effective drive is secured and the drive is in no way interfered with by reason of sidewise movement of the ring. The sidewise movement is preferably effected by a fluid actuated cylinder and the bar is held against such movement by reason of the fact that it extends through an opening in a holding ring. The holding ring has a substantially horizontal axis, but it is also rotated so as to turn the work. It is preferably provided with a replaceable liner for taking up wear, and also permitting of shearing different sized pieces.

While a fluid actuated means is desirable for causing the relative sidewise movement of the cutting ring and the holding, we prefer to use a positive stop for making certain that the rings are returned to proper relative position. This simplifies the feeding operation.

The feeding is preferably carried out by means of a feed table having a pusher. With said table there is combined a centering device for making certain that the stop is properly guided through the holding ring. The feeding device lies on one side of the shearing mechanism and on the other side we preferably provide a stop which not only serves as a measuring device for the pieces to be cut, but also centers and supports the projecting end of the work. After the cut is completed, the stop is retracted and the cut off piece falls onto a carrier which first moves it axially and out of the space occupied by the shearing mechanism and then discharges it in a sidewise direction.

Considerable speed in these operations may be secured by providing a constant force which also urges the stop and the discharge mechanism to retracted position while an overbalancing force under the control of the operator is provided for moving the parts towards the shear mechanism. Preferably air is employed as a moving force, there being a constant pressure of air in one end of an actuating cylinder, which air tends to force the parts away from the shear mechanism. A valved control pipe is connected into the opposite end of the cylinder and thus the mechanism may be readily controlled and will be very quick in operation.

In the accompanying drawings which illustrate the present preferred embodiment of our invention as applied to the shearing of bars.

Figures 4$^a$ and 4$^b$ are side elevations of the front and rear ends of the feed table;

Figures 5$^a$ and 5$^b$ are top plan views of the apparatus shown in Figures 4$^a$ and 4$^b$;

Figures 1, 2, 3, 8:
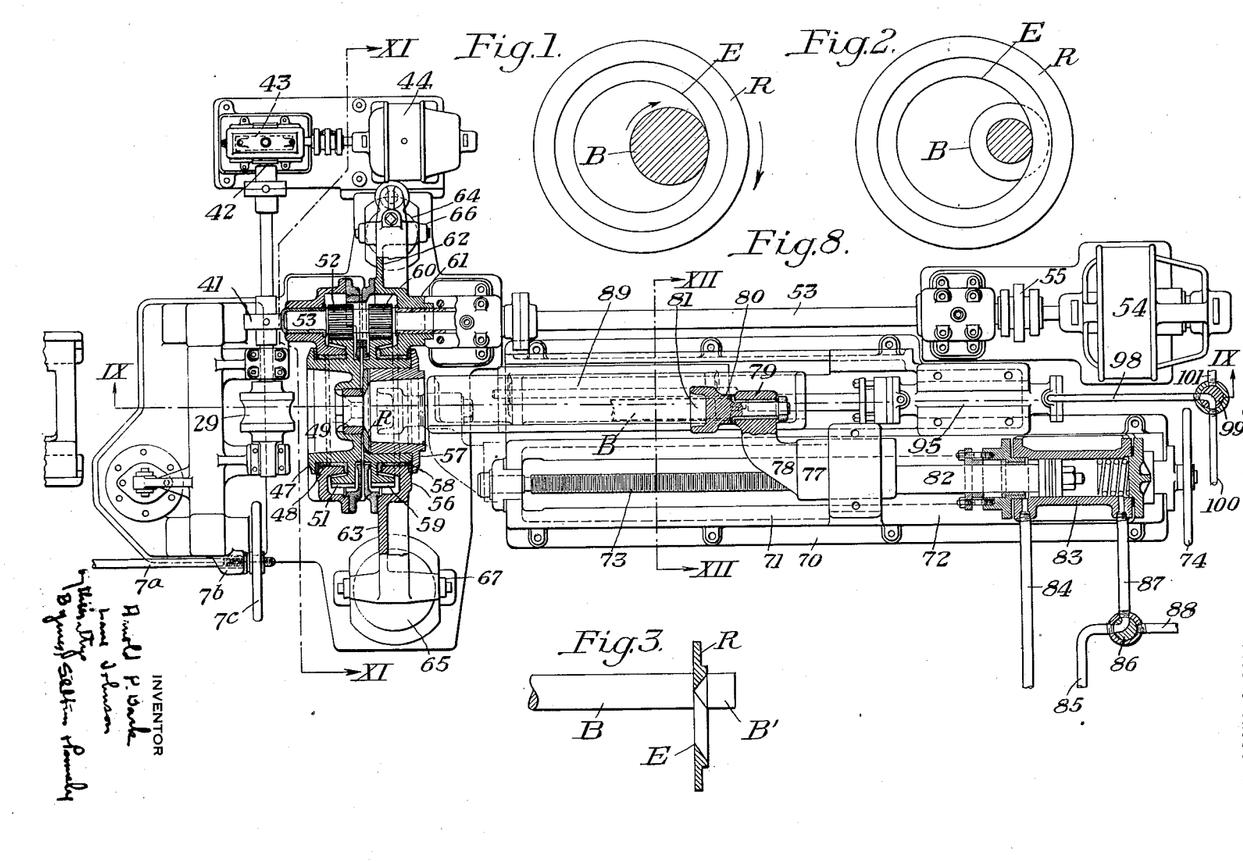
Figure 1 is a diagrammatic view illustrating a shearing ring just at the moment that it engages the work.
Figure 2 is a similar view showing the shearing operation about half completed.
Figure 3 is a diagrammatic view illustrating a work piece and a bar which has been sheared therefrom.
Figure 8 is a top plan view partly broken away of the shearing apparatus proper and the discharge mechanism.

Referring to Figures 1 to 3 inclusive, there is shown a circular bar B projecting through a shear ring R having an internal cutting edge E. The bar B and the ring R are both rotated in the direction indicated by arrows and at the same time the ring and the bar are moved relatively sidewise so that the active cutting edge progressively moves towards the axis of the bar B.

The result of such operation is shown in Figure 2. It will be seen that the bar is being gradually cut towards the center thus tending to produce a sheared piece which will be substantially symmetrical and will not have the rough faces or projecting and torn edges, such as result from ordinary shearing operations. Furthermore, neither the bar nor the sheared piece is distorted out of round, as would result if it were attempted to shear it in the ordinary way.

Figure 3 shows the relative position of the bar B, the sheared portion B′ and the shearing ring R at about the time the cut is completed. This view also shows the symmetrical character of the severed piece.

The practical illustrated embodiment of the invention will now be described in detail.

*Feed mechanism.*

Figures 4A, 4B:
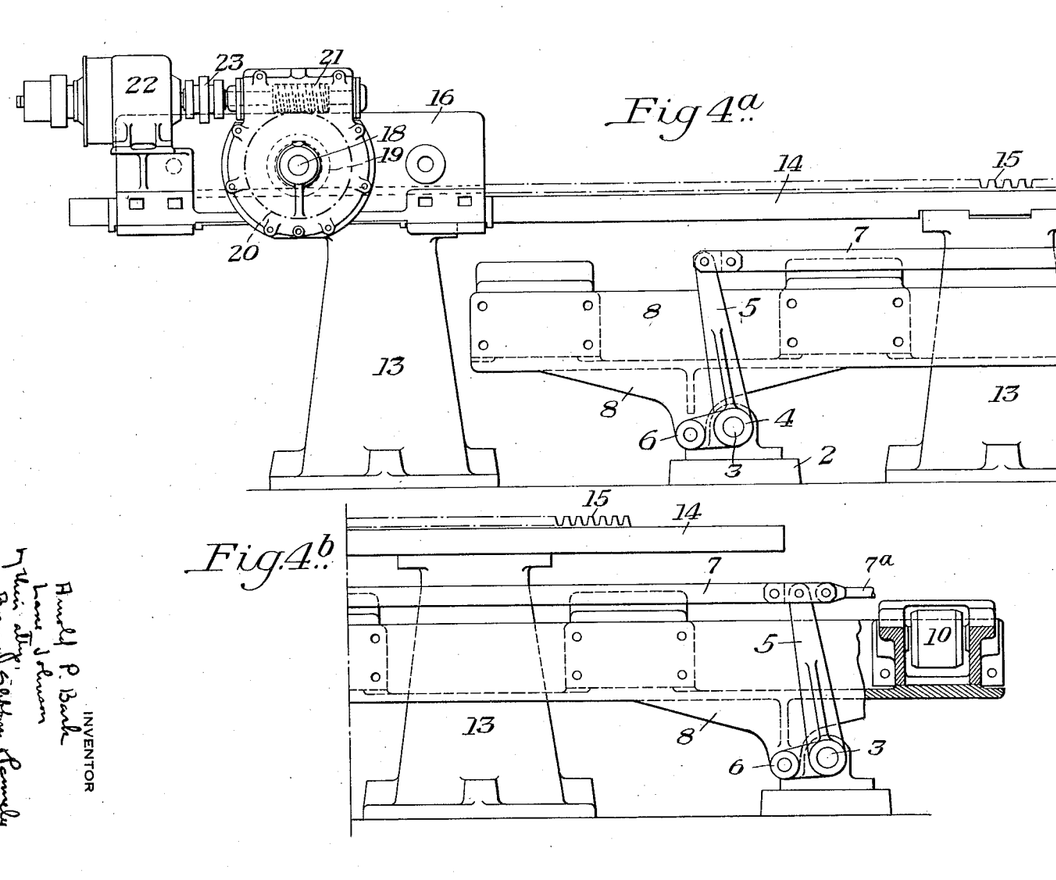
Figures 5A, 5B:
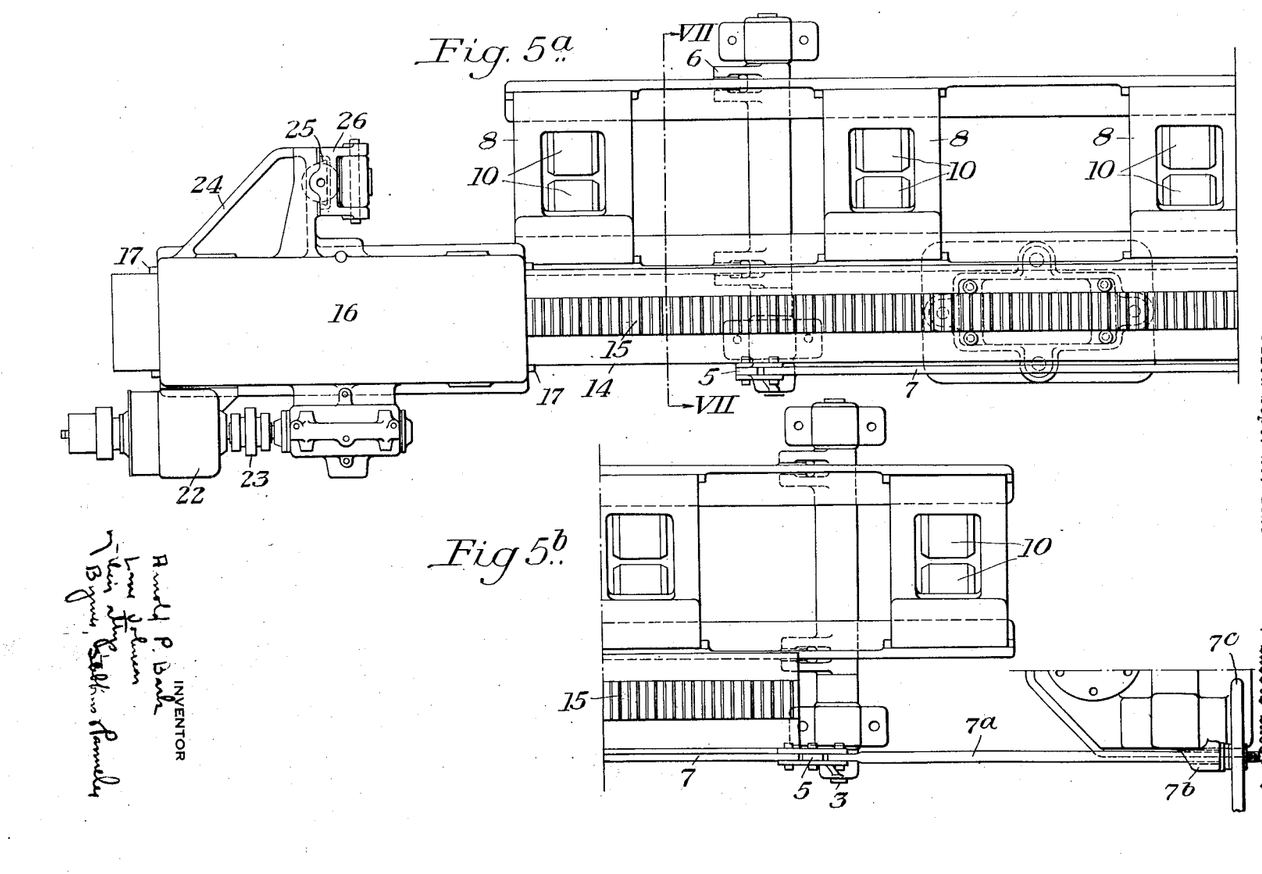
Figure 6:
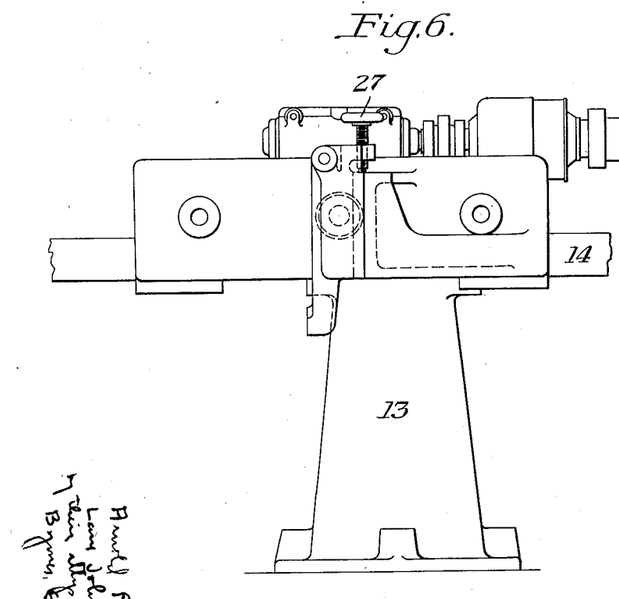
Figure 6 is a side elevation of a portion of Figure 4$^a$ but taken from the opposite side.

The feed mechanism is shown in detail in Figures 4$^a$, 4$^b$, 5$^a$, 5$^b$, 6 and 7. It comprises base members 2 secured to the floor and carrying cross shafts 3 having bell cranks 4 mounted thereon. The bell cranks have vertically extending arms 5 and horizontally extending arms 6. The arms 5 are connected by links 7 and it will be seen that if the links are moved one way or another, the horizontally extending arms 6 will be simultaneously raised or lowered. This movement is secured by providing a link 7$^a$ running through a frame member 7$^b$ and having a threaded portion on which is screwed a hand wheel 7$^c$. When the hand wheel 7$^c$ is turned in such direction as to move the link 7$^a$ to the right, as viewed in Figure 5$^b$, the bell crank arms 6 will be positively lifted. When the hand wheel is turned in the opposite direction the weight of the parts raised on the bell crank arms 6 causes them to lower.

Pivotally mounted on the arms 6 are frame members 8 which are connected by roll carriers 9. In each of the carriers there is provided a pair of supporting rolls 10, each having its axis extending lengthwise of the frame so as to provide a cradle for a bar B. It will be noted that one side 11 of the roll frame 9 is made relatively flat to facilitate the placing of a bar in the cradle while the other side is elevated somewhat, as indicated at 12, to prevent the bar from running across the cradle rolls 10.

Figure 7:
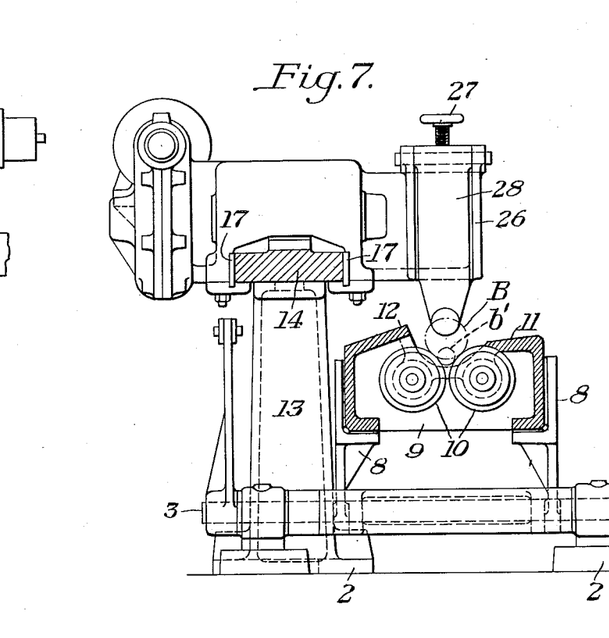
Figure 7 is a section taken on the line VII—VII of Figure 5$^a$.

We have indicated by $b'$ in Figure 7 a smaller size bar so as to show how the cradle rolls 10 effectively center any size of stock. This combination of the cradle rolls with the mechanism just described for raising or lowering the same makes it possible to supply bars of any size within limits, with their axes coincident with an arbitrary line, and this line is, of course, the axis of the holding ring in the shearing mechanism.

Lying alongside the supporting mechanism just described are a number of pedestals 13 on which is mounted a bed 14 having rack teeth 15 formed in the top face thereof. A slide, indicated generally by the reference character 16, is mounted on the bed 14. It is provided with gibs 17 (Fig. 7) and is free to move from one end to the other of the bed 14.

The slide has a shaft 18 journaled therein, this shaft carrying a pinion 19 meshing with the rack 15. The shaft also carries a worm wheel 20 meshing with a worm 21. The worm 21 is connected to a driving motor 22 through a flexible coupling 23.

The slide 16 is provided with an extension 24 at one side thereof and this extension has vertical ways 25 formed therein. A slide 26 is mounted in the ways 25, and a hand wheel 27 is provided for regulating its vertical position. A clapper arm 28 is mounted on the slide 26 and extends downwardly into proximity with the cradle rolls 10. Its position relative to the cradle rolls can be varied by moving the links 7 one way or another, or by actuating the hand wheel 27. Its function is to engage the rear end of a bar lying on the cradle rollers 10 and to feed the same forward.

Suitable controlling mechanism for the motor 22 is provided so as to cause the slide 16 to move to the right, as viewed in the drawings and thus feed a bar forward. During the feeding operation, the bar slides lengthwise over the rollers 10.

Figure 9:
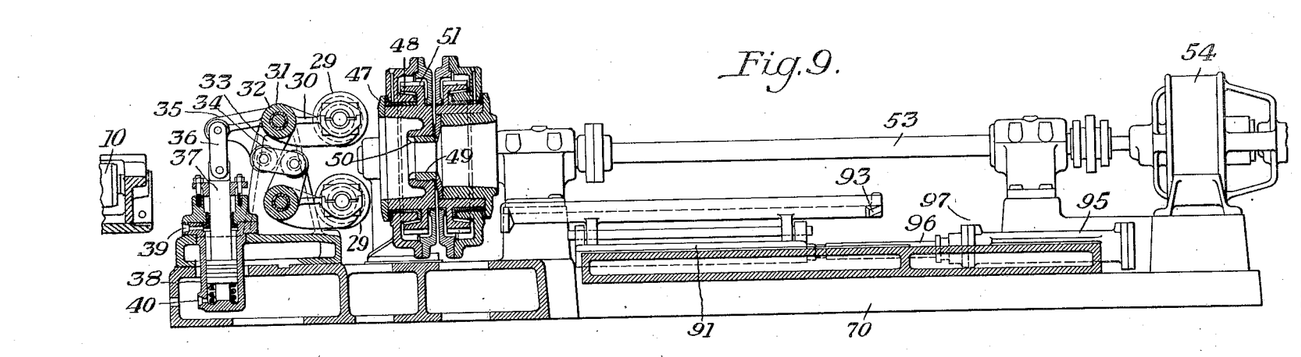
Figure 9 is a vertical section taken on the line IX—IX of Figure 8.
Figure 10:
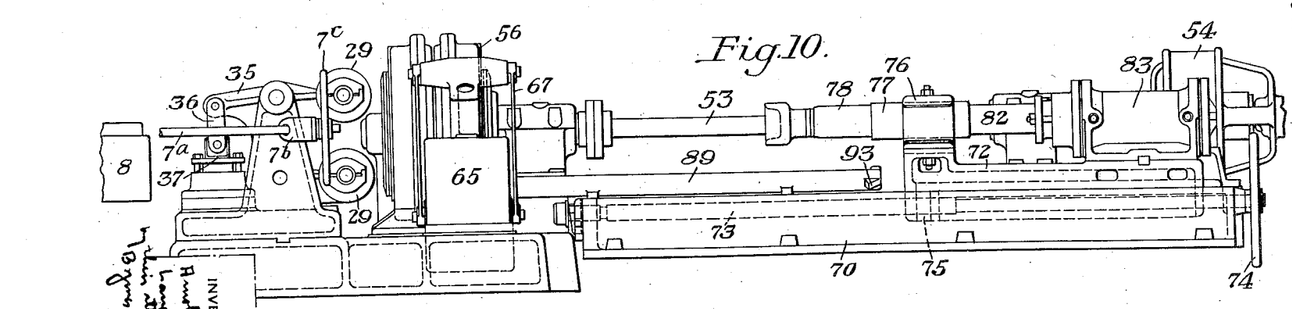
Figure 10 is a side elevation of the apparatus shown in Figures 8 and 9.

The relative position of the feed mechanism and the shearing apparatus proper is best shown in Figures 8 and 9. These drawings show that the feeding mechanism terminates some distance away from the shearing ring R and is, therefore, ineffective for feeding short pieces of stub ends of stock. In order to feed these to the shearing mechanism, we provide a pair of feed rolls 29. Each of these rolls is mounted between a pair of arms 30 formed on a sleeve 31, which is mounted on a shaft 32. Each of the sleeves 31 is provided with an arm 33 and these arms are connected by a link 34, as best shown in Figure 9.

By this means the rolls 29 are caused to move simultaneously in opposite directions and they will, therefore, be effective for centering a piece which is gripped between them.

One of the sleeves 32 is provided with an arm 35 which is connected through a link 36 to the piston 37 of a fluid cylinder 38. Fluid inlets 39 and 40 are provided for controlling the piston in the cylinder and the rolls 29 may thus be moved towards or away from one another.

One of the rolls 29 is connected through flexible couplings 41 to a shaft 42 which is driven through worm gearing 43 from a motor 44. When it is desired to feed a short piece the fluid supply to the cylinder 38 is so controlled as to cause the rolls 29 to grip the piece and the motor 44 is then operated to feed it forward.

*Shear mechanism.*

The shear mechanism is best shown in Figures 8 to 11 inclusive. It comprises a base 45 on which is mounted a stationary frame 46. A ring 47 is rotatably mounted in brasses 48 in the frame. The ring 47 constitutes the holding or supporting ring which prevents sidewise movement of the stock when the shearing ring is moved. It is provided with a replaceable insert 49 whose internal diameter is preferably very slightly larger than the stock. The mouth of the opening is nicely rounded, as indicated at 50, to facilitate entering of the bar.

The ring 47 is provided on its outer face with spur gear teeth 51 which mesh with a pinion 52 (Figure 8). The pinion is mounted on a shaft 53 which is connected to a motor 54 through a coupling 55.

Figure 11:
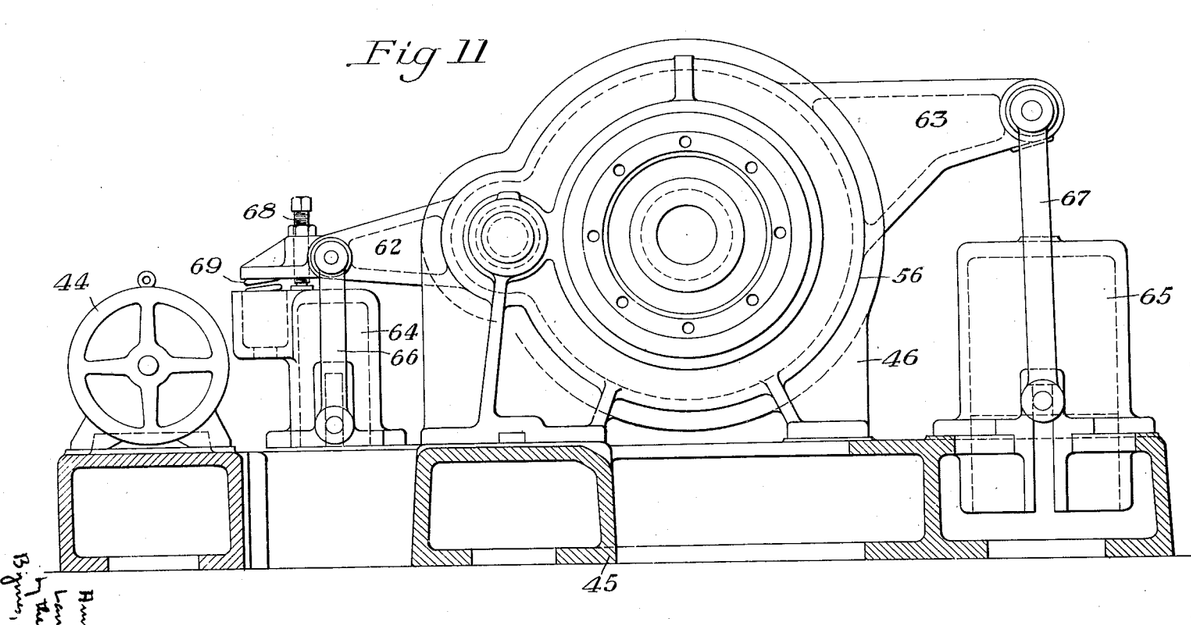
Figure 11 is a vertical transverse section to enlarged scale taken on the line XI—XI of Figure 8.

Mounted alongside the stationary frame 46 is a movable frame 56. The movable frame carries the shearing blade R, which is secured to a ring member 57 rotatably mounted in brasses 58 in the frame 56. The ring member 57 is provided with gear teeth 59 which mesh with a pinion 60 on the shaft 53. The frame 56 is pivotally mounted on the shaft 53 as indicated at 61. The frame is provided with arms 62 and 63 connected to the pistons of fluid cylinders 64 and 65, respectively, through links 66 and 67. (Figure 11.) The fluid pressure in the cylinder 64 normally urges the frame to the position shown in Figure 11 and a positive stop 68 is provided for limiting its action. This stop consists of an adjustable screw whereby the normal position of the pivoted frame may be shifted if desired. A spring buffer 69 is provided for eliminating shock when the stop 68 becomes effective.

When fluid pressure is supplied to the cylinder 65 it is effective for causing movement of the frame 56 relative to the frame 46 and thereby causing the shearing edge to bite into a bar.

It will be seen from Figure 11 that the cylinder 65 is materially larger than the cylinder 64. Fluid pressure is constantly applied to the cylinder 64, and when a cutting stroke is to be made, fluid under pressure is supplied to the cylinder 65, thus overcoming the action of the cylinder 64. As soon, however, as the fluid pressure is released from the cylinder 65 the frame 56 again moves back to normal position.

*Measuring and discharge mechanism.*

On the side of the shearing apparatus opposite the feeding mechanism there is provided a base 70 having ways 71 in which there is arranged a slide 72. A lead screw 73 extends the entire length of the base 71 and is provided with a hand wheel 74. The slide 72 has a nut 75 which engages the lead screw and, therefore, rotation of the hand wheel is effective for moving the slide back and forth.

Mounted on the slide 72 is a bearing 76 in which there is slidably mounted a member 77 which is rectangular in cross section to prevent rotation thereof. The member 77 carries a sidewise extending arm 78 in which there is formed a bearing 79. The bearing 79 accommodates a stop 80 having a cup shaped end 81 adapted to receive the leading end of the bar stock as it is fed through the shearing mechanism. It also serves to support the free end of the stock during the cutting operation, and for this reason it is made rotatable.

The member 77 is connected to the piston rod 82 of a fluid cylinder 83 mounted on the slide 72. Fluid under constant pressure is supplied through a conduit 84, and as will be seen from Figure 8, this pressure also tends to move the stop 80 from the shearing mechanism. The opposite end of the cylinder 83 is connected to a fluid supply pipe 85 through a three way control valve 86 and a pipe 87. The pipe 85 is connected to a source of higher air pressure than the pipe 84 and, therefore, the stop 80 will be urged towards the shearing mechanism so long as the valve 86 remains in the position shown in Figure 8. When the valve is in such position, the shear is ready to receive a bar to be cut. The feeding slide 16 is, therefore, moved forward until the end of the bar lies in the cup 81, as indicated at B in Figure 8. We have shown the entire stop mechanism as having been displaced a short distance to the right, as viewed in Figure 8, but it will be understood that as soon as the slide 16 is backed away from the trailing end of the bar B, the fluid pressure supplied through the pipe 85 will cause the stop mechanism to move back towards the shear until the piston in the cylinder 83 reaches the end of its travel. The mechanism above described, therefore, provides a yieldable stop which, however, is effective for accurately positioning the bar.

In Figure 8 we have shown the maximum forward position of the stop 80 in chain lines, and it will be seen that very short pieces can be cut from the bar.

After the cut is completed, the valve 86 is thrown to such position that the pipe 87 is connected with an outlet pipe 88, thus relieving the pressure which was urging the stop towards the shear. The fluid pressure in the other end of the cylinder immediately becomes effective for retracting the stop 80, thus permitting the severed bar to fall. The arrangement described operates much faster than mechanisms wherein it is not only necessary to relieve fluid pressure in one end of the cylinder, but also to supply fluid pressure to the other end.

When the bar is released by the stop 80 it falls onto a cradle 89. This cradle is pivotally mounted at 90 on a slide 91 (Figure 12).

Figure 12:
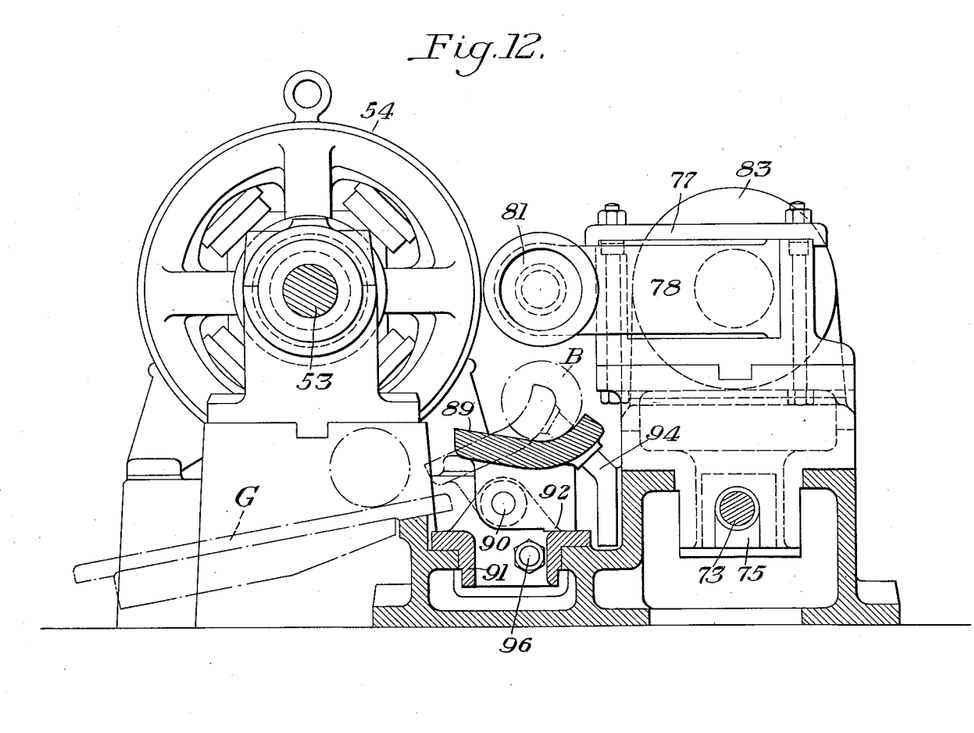
Figure 12 is a vertical transverse section to an enlarged scale taken on the line XII—XII of Figure 8.

The cradle 89 is provided with feet 92 which normally rests on the slide and hold the cradle in the position shown in Figure 12. However, it is also provided with a cam follower 93 which is adapted to engage translation cam 94 when the cradle 89 is moved away from the shearing mechanism, and thus tilt the cradle to the chain line position of Figure 12. Such action is, of course, effective for moving the bar first in a lengthwise direction away from the shear and then, as the cradle is tilted causing it to roll sidewise, to be carried off by any suitable means, such as guides indicated at G in Figure 12.

The mechaism for moving the cradle 89 back and forth is best shown in Figures 8 and 9. It comprises a fluid cylinder 95 having a piston therein connected to a piston rod 96 which is secured to the frame 91. One end of the cylinder 95 is connected to a conduit 97 which supplies fluid under a constant pressure at all times. The other end is connected to a conduit 98 leading to a control valve 99, which in turn is connected to a fluid supply pipe 100. The fluid pressure supplied from the pipe 100 is sufficient to overbalance the pressure supplied through the pipe 97 and the cradle, and, therefore, normally occupy the position shown in Figures 8, 9 and 10, and it will be in this position when it receives a severed bar. The control valve 99 is then thrown to such position that the pipe 98 is connected to a discharge pipe 101 whereupon the fluid pressure in one end of the cylinder is relieved and the constant pressure supplied through the pipe 97 causes retraction of the slide 91, and with it the cradle 89 and the severed bar. Near the end of the structure the cam 94 engages the follower 93 and the severed piece is discharged in a sidewise direction.

We have illustrated and described a preferred embodiment of the invention as it is used for the shearing of bars. It will be understood, however, that the invention is not limited to this form, since it may be otherwise embodied or practiced within the scope of the following claims:—

We claim:—

1. Shearing apparatus, including a ring having an internal shearing edge, means for supporting a bar in such manner as to project through the ring, means for rotating the bar, means for rotating the ring, and means for causing relative sidewise movement of the ring and the bar.

2. Shearing apparatus, including a hollow shaft having an internal shearing edge at one end thereof, a second hollow shaft adapted to lie in substantially co-axial relation with the first mentioned shaft and adapted to accommodate a bar to be sheared, means for rotating the shafts, and means for relatively displacing the axes of the shafts sidewise.

3. Shearing apparatus including a ring having an internal shearing edge, means for supporting a bar in such manner as to project through the ring, means for rotating the ring and means for causing relative sidewise movement of the ring and the bar.

4. Shearing apparatus including a pivoted frame, a ring rotatably mounted therein, the ring having an internal shearing edge, means for supporting a bar in such manner as to project through the ring, gear teeth on the ring and a drive pinion meshing with the gear teeth, the frame being pivoted around the axis of said pinion.

5. Shearing apparatus including a pivoted frame, a ring rotatably mounted therein, the ring having an internal shearing edge, means for supporting a bar in such manner as to project through the ring, gear teeth on the ring, a drive pinion meshing with the gear teeth, the frame being pivoted around the axis of said pinion, a stationary frame lying alongside the pivoted frame, and a work holding ring rotatable in the stationary frame.

6. Shearing apparatus including a pair of frames lying side by side, rings rotatably mounted therein, one of said rings having an internal shearing edge, and drive means for the rings, the frames being relatively movable sidewise of the axes of the rings.

7. Shearing apparatus including a pair of frames lying side by side, rings rotatably mounted in the frames, one ring having an internal shearing edge, the rings each having gear teeth formed thereon, and a single drive shaft having pinion teeth thereon meshing with the gear teeth on the rings, the frames being relatively movable about the axis of the drive shaft.

8. Shearing apparatus including a pivoted frame, a ring rotatably mounted therein, the ring having an internal shearing edge, means for supporting a bar in such manner as to project through the ring, gear teeth on the ring, a drive pinion meshing with the gear teeth, the frame being pivoted around the axis of said pinion, and fluid pressure means for controlling the pivotal movement of the frame.

9. Shearing apparatus including a pivoted frame, a ring rotatably mounted therein, the ring having an internal shearing edge, means for supporting a bar in such manner as to project through the ring, gear teeth on the ring, a drive pinion meshing with the gear teeth, the frame being pivoted around the axis of said pinion, fluid cylinder means normally holding the frame in a desired position, and a second fluid cylinder means adapted for overcoming the effect of the first mentioned cylinder means and causing a cutting movement.

10. Shearing apparatus including a pivoted frame, a ring rotatably mounted therein, the ring having an internal shearing edge, means for supporting a bar in such manner as to project through the ring, gear teeth on the ring, a drive pinion meshing with the gear teeth, the frame being pivoted around the axis of said pinion, fluid cylinder means normally holding the frame in a desired position, a second fluid cylinder means adapted for overcoming the effect of the first mentioned cylinder means and causing a cutting movement and a positive stop for the first mentioned cylinder means.

11. Shearing apparatus including a pair of frames lying side by side, rings rotatably mounted therein, one of the rings having an internal shearing edge, drive means for the rings, the frames being relatively movable sidewise of the axes of the rings, and a positive stop for holding the frames in desired relative position at one end of their movement.

12. Shearing apparatus including a pair of frames lying side by side, rings rotatably mounted therein, one ring having an internal shearing edge and the other ring having a replaceable liner adapted to support the work, and drive means for the rings, the frames being relatively movable sidewise of the axes of the rings.

13. Shearing apparatus including a frame having a material receiving opening with a substantially fixed axis, a ring with an internal shearing edge lying alongside the frame, means for rotating the ring, means for moving the ring sidewise, and material supporting means adapted to hold supplied material with its axis substantially coincidental with the axis of the material receiving opening.

14. Shearing apparatus including a frame having a material receiving opening with a substantially fixed axis, a ring with an internal shearing edge lying alongside the frame, means for rotating the ring, means for moving the ring sidewise, and cradle means adapted to hold bars of various sizes with their axes lying in a common plane, the cradle means being vertically adjustable.

15. Shearing apparatus including a frame having a material receiving opening with a substantially fixed axis, a ring with an internal shearing edge lying alongside the frame, means for rotating the ring, means for moving the ring sidewise, material supporting means adapted to hold supplied material with its axis substantially coincidental with the axis of the material receiving opening, and a pusher for material lying on the supporting means.

16. Shearing apparatus including a frame having a material receiving opening with a substantially fixed axis, a ring with an internal shearing edge lying alongside the frame, means for rotating the ring, means for moving the ring sidewise, material supporting means adapted to hold supplied material with its axis substantially coincidental with the axis of the material receiving opening, and a pair of feed rolls simultaneously movable towards and away from material on the supply means.

17. Shearing apparatus including a frame having a material receiving opening with a substantially fixed axis, a ring with an internal shearing edge lying alongside the frame, means for rotating the ring, means for moving the ring sidewise, and a pair of feed rolls simultaneously movable towards and away from the axis of the material receiving opening, and adapted to supply material through the opening.

18. Shearing apparatus including a frame having a material receiving opening with a substantially fixed axis, a ring with an internal shearing edge lying alongside the frame, means for rotating the ring, means for moving the ring sidewise, a pair of feed rolls simultaneously movable towards and away from the axis of the material receiving opening and adapted to supply material through the opening, a stationary power source for the feed rolls, and a flexible driving connection between the power source and the feed rolls.

19. Shearing apparatus including a frame having a material receiving opening with a substantially fixed axis, a ring with an internal shearing edge lying alongside the frame, means for rotating the ring, means for moving the ring sidewise, and material supporting means adapted to receive material to be supplied to the shearing mechanism, said supporting means being effective for centering the material with respect to the material receiving opening.

20. Shearing apparatus including a frame having a material receiving opening with a substantially fixed axis, a ring with an internal shearing edge lying alongside the frame, means for rotating the ring, means for moving the ring sidewise, vertically adjustable material supporting means, and a vertically adjustable pusher adapted for moving material into the receiving opening.

21. Shearing apparatus including a frame having a material receiving opening, a ring lying alongside the frame and having a cutting internal edge, means for rotating the ring, means for moving the ring sidewise, material supply means lying on one side of the frame adapted to feed a bar through the frame and the ring, and a stop for the bar.

22. Shearing apparatus including a frame having a material receiving opening, a ring lying alongside the frame and having a cutting internal edge, means for rotating the ring, means for moving the ring sidewise, material supply means lying on one side of the frame adapted to feed a bar through the frame and the ring, a stop for the bar, and means for retracting the stop.

23. Shearing apparatus including a frame having a material receiving opening, a ring lying alongside the frame and having a cutting internal edge, means for rotating the ring, means for moving the ring sidewise, material supply means lying on one side of the frame adapted to feed a bar through the frame and the ring, and a stop for the bar, the stop being adjustable to different distances from the ring.

24. Shearing apparatus including a frame having a material receiving opening, a ring lying alongside the frame and having a cutting internal edge, means for rotating the ring, means for moving the ring sidewise, material supply means lying on one side of the frame adapted to feed a bar through the frame and the ring, a frame adjustable to different distances from the ring, a fluid cylinder on the frame, a piston in the cylinder, a stop connected to the piston and adapted to engage bars fed through the ring, and fluid supply means for moving the stop relative to the frame.

25. Shearing apparatus including a frame having a material receiving opening, a ring lying alongside the frame and having a cutting internal edge, means for rotating the ring, means for moving the ring sidewise, material supply means lying on one side of the frame adapted to feed a bar through the frame and the ring, a frame adjustable to different distances from the ring, a fluid cylinder on the frame, a piston in the cylinder, a stop connected to the piston and adapted to engage bars fed through the ring, and fluid supply means for moving the stop relative to the frame, the fluid supply means comprising a source of substantially constant fluid pressure effective for always urging the piston in one direction, and a second source of fluid pressure effective for overbalancing the first mentioned fluid pressure when desired.

26 Shearing apparatus including a frame, a ring with an internal shearing edge lying alongside the frame, means for rotating the ring, means for moving the ring sidewise, a receiver for material cut by the ring upon such movements thereof, and means for moving the receiver away from the ring and then discharging the material sidewise thereof.

27. Shearing apparatus including a frame, a ring with an internal shearing edge lying alongside the frame, means for rotating the ring, means for moving the ring sidewise, a receiver for material cut by the ring upon such movements thereof, a fluid cylinder for moving the receiver away from the ring and means for discharging material sidewise of the receiver upon such movement.

28. Shearing apparatus including a frame having a material receiving opening, a ring lying alongside the frame and having an internal cutting edge, means for rotating the ring, means for moving the ring sidewise, a material supply means adapted to feed a bar through the frame and the ring, and stop and support means for the projecting end of the bar.

29. Shearing apparatus including a frame having a material receiving opening, a ring lying alongside the frame and having an internal cutting edge, means for rotating the ring, means for moving the ring sidewise, a material supply means adapted to feed a bar through the frame and the ring, and stop and support means for the projecting end of the bar, the stop and support means being retractable.

In testimony whereof we have hereunto set our hands.

ARNOLD P. BARK.
LANE JOHNSON.